N. A. BAKER.
Improvement in Harvesters.
No. 126,919.　　　　　　　　　　Patented May 21, 1872.
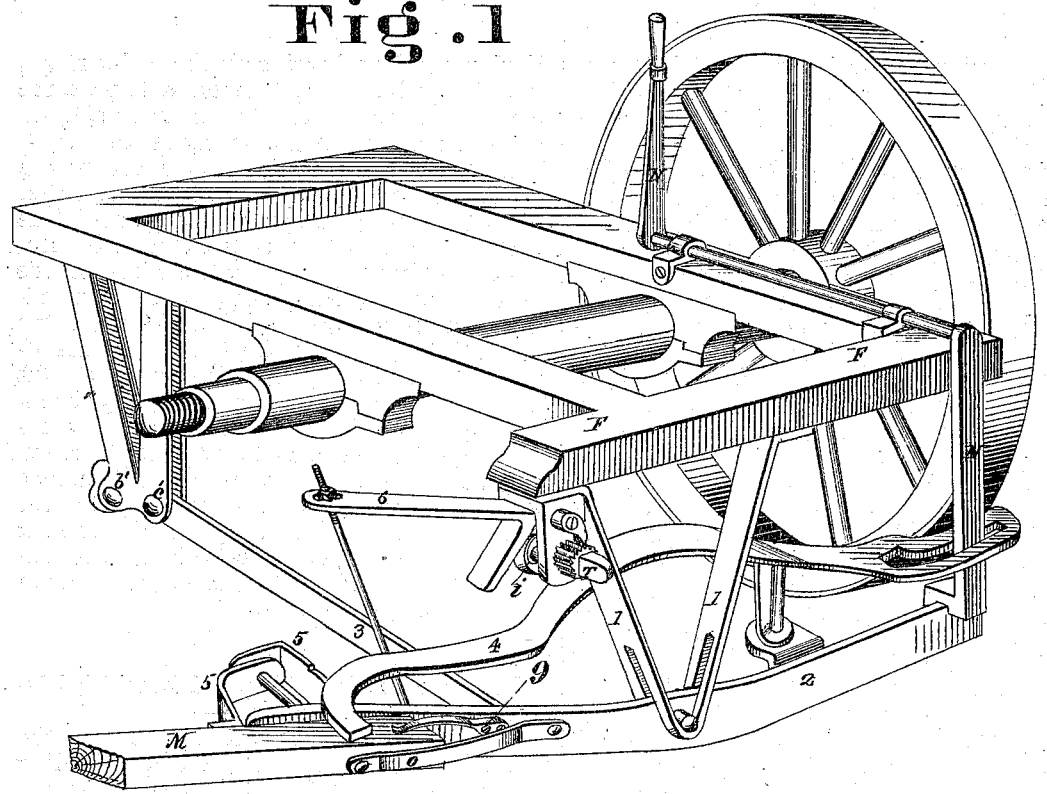
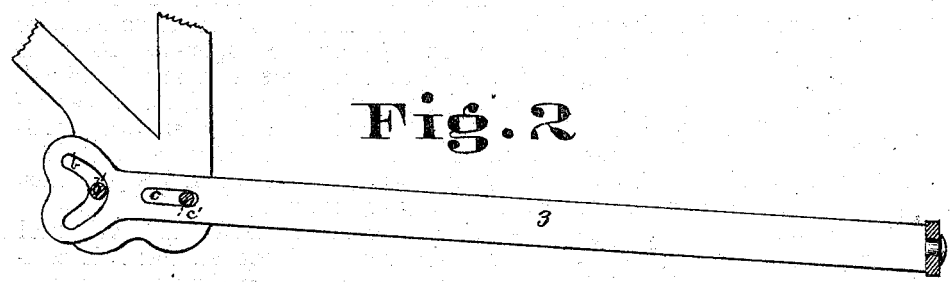
Attest　　　　　　　　　　Inventor
　　　　　　　　　　　　　N A Baker 126,919

UNITED STATES PATENT OFFICE.

NOAH A. BAKER, OF COVINGTON, KENTUCKY, ASSIGNOR TO HIMSELF AND J. O'HARA, JR., OF SAME PLACE.

IMPROVEMENT IN HARVESTERS.

Specification forming part of Letters Patent No. 126,919, dated May 21, 1872.

Specification of the invention of NOAH A. BAKER, of Covington, Kentucky, of the Improved Hanging Apparatus for Reapers and Mowers.

Figure 1 represents in perspective the main frame of a harvester with my improvements attached; F F, the frame of the machine; 1 1, a V-shaped pendant attached to the under side of the frame F F; 2, hanging or coupling bar, moving up and down about the pivot at the bottom of the pendant; 3, sliding brace, attached to hanging-bar 2, and extending back diagonally, and attached to a pendant at the rear end of the frame F F; 4, slotted catch-lever, pivoted on hanging-bar 2; 5, double brace, connecting hanging-bar 2 and cutter-bar M; O, brace-connecting bars 2 and M; 6, lever, with pendant attached to spring $i$; $i$, coil-spring, with lever attachment, supporting hanging-bar 2 by rod or chains; T, thumb-ratchet, for adjusting the tension of coil-spring $i$; 9, spring on hanging-bar 2, engaging end of cutter-bar M; N N, lever controlling hanging-bar 2 and catch-lever 4.

Fig. 2 is a plan view of the sliding brace 3, represented in Fig. 1; $b$, transverse curved slat, with pin $b'$, as in Fig. 1; $c$, horizontal straight slat with pin $c'$.

This entire apparatus should be constructed in metal.

Its Operation.

The V-shaped pendant, attached to the under side of the frame F F, in front, supports the hanging or coupling bar 2 by a pin at its bottom, passing through the bar at or about its middle point. The near end of the bar 2 is turned slightly upward, the other end is attached to the cutter-bar M by the pin that also secures the front brace O and the rear double brace 5. The hanging-bar 2, braced by the sliding brace 3, which extends diagonally back, and is attached to the rear end of the frame F F, and having the transverse and longitudinal slats engaging the pins, as shown by $b$ and $c$ in Fig. 2; its bearing is such that it compels the bar 2 to rise and fall in a perpendicular line. The horizontal lever 6, connected by rod or chain with the bar 2, and having a perpendicular pendant bearing on the coil-spring $i$, to which it is attached, sustains, in part, the weight of the bar 2 and its connections, tightens and strengthens the spring as the weight is increased. The spring 9, attached to the cutter-bar 2, engages the end of the cutter-bar M, and aids in holding it off the ground. The upright arm of the lever N N, when the machine is at work on a smooth surface, stands perpendicularly, while the pendent arm inclines, and, passing through the slot in the catch-lever 4, rests on the bar 2, near the V-shaped pendant. When it is necessary to lift the cutter-bar over any obstruction, by inclining the upright arm of the lever N inwardly the pendent arm is thrown out, depressing that end of the bar 2, and at the same time casting the catch of lever 4 over the end of the cutter-bar M, stiffening the joint with the bar 2, and compelling it to rise with it. The coil-spring $i$, with its lever attachment, also aids in this elevating movement.

Claim.

I claim as my invention, and for which I desire Letters Patent to issue—

1. The coupling-bar 2, connected with the finger-bar M by a flexible joint, and holding the finger-bar in position by means of the front brace O, the rear double brace 5, and the spring 9, substantially as shown and described.

2. The catch-lever 4, worked by the lever N, in combination with the coupling-bar 2 to stiffen the joint of the finger-bar M when raised, substantially as shown and described.

3. The coil-spring $i$, made adjustable, as described, in combination with lever 6, and pendent lever bearing on spring for the purpose of relieving the weight of the cutting apparatus, substantially as set forth.

4. The brace 3, provided with horizontal slat $c$ and transversed curved slat $b$, in combination with pins $c'$ $b'$, for insuring a perpendicular movement to the coupling-bar 2, substantially as described.

N. A. BAKER.

Witnesses:
CHAS. G. WARREN,
FRANK P. HELEN.